United States Patent [19]
Little et al.

[11] Patent Number: 6,027,558
[45] Date of Patent: Feb. 22, 2000

[54] HYDRATED LIME ADDED DIRECTLY TO ASPHALT CEMENT AS A MULTI-FUNCTIONAL MODIFIER FOR ASPHALT MIXTURES

[75] Inventors: Dallas N. Little, Bryan, Tex.; Robin E. Graves, Henderson, Nev.; Fred R. Huege, Colleyville, Tex.

[73] Assignee: Chemical Lime Company, Fort Worth, Tex.

[21] Appl. No.: 09/110,410

[22] Filed: Jul. 6, 1998

Related U.S. Application Data

[60] Provisional application No. 60/051,782, Jul. 7, 1997.

[51] Int. Cl.$^7$ .................................................. C09D 145/00
[52] U.S. Cl. ........................................ 106/284.04
[58] Field of Search ........................................ 106/284.04

[56] References Cited

U.S. PATENT DOCUMENTS 330,196  11/1885  Barber ................................. 106/284.04
1,234,360  7/1917  McGrath ............................. 106/284.04

OTHER PUBLICATIONS

International Search Report, PCT/US98/14077 (not published).

*Primary Examiner*—David Brunsman
*Attorney, Agent, or Firm*—Charles D. Gunter, Jr.

[57] ABSTRACT

A hot mix asphalt composition and method are shown in which hydrated lime is added directly to the asphalt binder prior to the addition of the asphalt binder to the mineral aggregate constituent of the composition. The lime-asphalt mixture is then added to the mineral aggregate. The lime component is added to the asphalt binder in an amount which exceeds about 10% by weight, based upon the total weight of asphalt binder in the composition.

8 Claims, 7 Drawing Sheets

HYDRATED LIME ADDED DIRECTLY TO ASPHALT CEMENT AS A MULTI-FUNCTIONAL MODIFIER FOR ASPHALT MIXTURES

This application claims benefit of Provisional Appln. 60/051,782 filed Jul. 7, 1997.

BACKGROUND OF THE INVENTION

1. Field of the Invention

The present invention relates to improvements in the art of making bituminous substrates, such as road surfaces, employing hot mix asphalt.

2. Description of the Prior Art

Asphalt surface course has been used for many years for roadways. The hot mix asphalt (HMA) is comprised of sand as one component, an aggregate or mineral component, and asphalt. The type of aggregate may vary widely, but may include such materials as granite, quartz and limestone materials. Asphalt forms a continuous phase and acts as a binding agent for the mineral aggregate. The continued preservation of bond between the asphalt and rock or mineral content of the composition is necessary to insure a lasting pavement.

The use of hydrated lime, $Ca(OH)_2$, to treat the aggregate in HMA is well accepted technology to improve the performance of the asphalt/aggregate blend. The effects of lime as an anti-strip additive when lime is added directly to the aggregate are well established. Typically, dry hydrated lime is mixed with the aggregate. The lime promotes extended mixture life by improving the asphalt-aggregate bond and by reducing the susceptibility of the mixture to soften when water is absorbed within the mixture. Amounts used are 1–3% lime based on the total weight of HMA. The benefits of lime are believed to be the result of interaction between the inorganic aggregate and the organic bituminous asphalt binder.

While lime has been used by adding it directly to the aggregate prior to the addition of the asphalt binder, Applicants' are unaware of any work in which lime is added directly to the asphalt binder in quantities sufficient to act as a multi-function modifier with the binder then being added to treated or untreated aggregate.

SUMMARY OF THE INVENTION

In the method of the invention, a hot mix asphalt paving material is prepared which contains mineral aggregate material and asphalt binder. A lime component is first added directly to the asphalt binder prior to addition of the asphalt binder to the mineral aggregate material to thereby form a lime-asphalt mixture. The lime-asphalt mixture is then combined with the mineral aggregate material to form a hot mix asphalt. The lime component is added to the asphalt binder in an amount which exceeds about 10% by weight, based upon the total weight of asphalt binder. Preferably, the lime component is hydrated lime which is added to the asphalt binder in the range from about 10% to 20% by weight, based on the total weight of asphalt binder.

An improved hot mix asphalt paving composition is also shown comprising a lime-asphalt mixture and mineral aggregate, the lime-asphalt mixture being first formed by adding a lime component directly to an asphalt binder prior to addition of the asphalt binder to the mineral aggregate material. The lime component is present in the lime-asphalt mixture in an amount which exceeds about 10% by weight, based upon the total weight of asphalt binder.

The addition of selected ranges of hydrated lime directly to the asphalt binder produces significant which are not limited to anti-stripping or moisture resistance. Hydrated lime has been found to perform as a multi-functional modifier when added directly to asphalt cement. Lime improves the rheological properties of the asphalt cement through a filler effect. Furthermore, lime has a physio-chemical effect as an additive as it interacts with certain functional groups within the asphalt cement to inhibit the effects of oxidative age hardening. The physical filler effect and the ability of the lime to inhibit age hardening act synergistically to improve resistance to low temperature fracture and load-induced fatigue fracture of the bitumen. Experimental results show a toughening effect due to lime addition to the binder at low temperatures.

The addition of lime directly to the asphalt binder at rates of between about 10% to 20% HL by weight, based on the total weight of the asphalt binder, improves the desirable qualities both of the binder and the resulting mixture. Applications of the method of the invention include: 1) use as a modifier added directly to the binder to meet Superpave Performance Grade specifications, 2) use as a general, multi-purpose additive to improve the performance of recycled mixtures, both central plant and cold in-place.

DETAILED DESCRIPTION OF THE INVENTION

The present invention is directed to improvements in hot mix asphalt (HMA) and similar bituminous compositions in which a lime component, preferably hydrated lime (HL), is added directly to the bitumen in lieu of to the aggregate.

In the discussion which follows, the term "hydrated lime" will be taken to mean $Ca(OH)_2$. The term "lime" refers to calcium containing compounds with the functional component of either CaO or $Ca(OH)_2$, and includes such compounds as dolomitic lime ($Ca(OH)_2Mg(OH)_2$) and its derivatives. In the production of hydrated lime, limestone or calcium carbonate is first heated to remove carbon dioxide. The remaining calcium oxide, called quicklime, is a very active chemical. To improve the handling characteristics of the quicklime, a controlled amount of water is added to form calcium hydroxide, commonly referred to as hydrated lime.

Adding a lime component to the aggregate is commonly done with the intention of improving the bond between the aggregate and bitumen, especially in the presence of water which has a stronger affinity for the aggregate than the bitumen does. Hydrated lime added to the aggregate is accepted as an effective antistripping agent and has been considered to have ancillary positive effects on the asphalt mixture.

The mechanism by which HL improves aggregate-bitumen adhesion and moisture sensitivity when the HL is added directly to the aggregate is reasonably well understood although some arguments still exist as to the mechanisms responsible. It is theorized that the lime decrease the interfacial tension between the asphalt and water, thus resulting in good adhesion. It is also thought that the hydrated lime improves the stripping resistance by interacting with the carboxylic acids in the asphalt. This interaction forms insoluble products that are readily adsorbed onto the surface of the aggregate. Some studies indicate that strong adsorption of calcium onto mineral aggregate surfaces may contribute to bonding of asphalt cements with the aggregate. The prior art has generally recommended that the amount of lime added to the aggregate should be between about 1.0 and 1.5% by weight, based on the weight of aggregate.

The ability of the HL to provide improved high temperature permanent deformation resistance (rutting in the wheel path due to repeated loading) and a reduction in the age hardening effects has not been well researched. For example, with regard to rutting, one theory advanced is that the HL acts as a filler. However, as will be discussed, to be an effective filler, the HL would need to be added in a manner which would promote homogeneous dispersion throughout the bitumen and thus provide a reinforcement in the bitumen "film" that encapsulates the aggregate particles. This result would not likely occur to any effective degree in current mixing operations where the HL is added in relatively small weight percentages to the aggregate rather than directly to the binder.

The method of the present invention demonstrates that HL added directly to bitumen has a multi-functional effect. The effect which is achieved is more than simply that of an antistrip additive. HL was added directly to five different bitumens (denoted AAB, AD, AAF, AAG and AAM) which represent the range of bitumens that would reasonably be encountered in the United States and throughout most of the world. Each of the selected bitumens represents a wide variety of bitumen chemical and physical properties. The research in the bitumen study concentrated on using testing techniques that are now being accepted by the industry as part of the Strategic Highway Research Program's (SHRP) Superpave protocol. However, some non-traditional tests were also performed. The testing protocol is given below:

| Test | Parameters Measured | Purpose of Test |
|---|---|---|
| Series I - Investigation of low temperature performance IDT - Performed at three low temperatures for one hour to provide low temperature creep compliance on mixtures subject to aging (loose mix and compacted mix) according to Superpave protocol | Creep compliance versus time of loading - ultimate compliance, rate of change in compliance | Assess lo temperature fracture properties (2 replicates for each mixture system 18 samples) |
| IDT - Tensile strength at three low temperatures on mixtures subjected to aging as described above | Stress and strain at failure | Assess low temperature fracture properties (18 samples) |

-continued

| Test | Parameters Measured | Purpose of Test |
|---|---|---|
| (AAMAS protocol) Series II - Investigation of intermediate temperature performance IDT - creep and tensile strength at intermediate temperature (20 C.) to assess fracture properties (AAMAS protocol) | Creep compliance versus time of loading - ultimate compliance, rate of change in compliance | Assess intermediate temperature fracture fatigue properties (36 samples) |
| Series III - Investigation of moisture resistance perform AASHTO T-283 | Retained tensile strength | Assess effect of HL on moisture resistance (18 samples) |
| SERIES IV - Investigation of high temperature performance Compressive creep performed at 60 C. one hour to assess permanent deformation potential (AAMAS protocol) | Creep compliance versus time of loading - ultimate compliance, rate of change in compliance | Assess effect of HL on high temperature rutting (6 samples) |
| Repeated load (axial loading) permanent deformation testing at 60 C. | Ultimate accumulated strain, rate of accumulated strain and slope of steady state region | Assess susceptibility of permanent deformation and the effect of HL (6 samples) |
| Repeated shear permanent deformation testing at 60 C. | Same as above | Same as above (6 samples) |

The following summary of the experimental work is divided into three sections: high temperature rheology, low temperature rheology and intermediate temperature rheology. At high pavement temperatures, asphalt becomes soft and susceptible to shoving and rutting. The tests performed evaluated the ability of the bitumen to withstand the stresses induced in high temperature environments. At low pavement temperatures, asphalt becomes hard and susceptible to fracture. This is particularly true for asphalt mixtures that have become embrittled due to aging. The tests performed at low temperatures evaluate the ability of the bitumen to withstand load-induced and environmentally induced stresses at low temperatures. Load-induced fatigue cracking typically occurs at low and intermediate pavement temperatures. The test performed at intermediate or average pavement temperatures assess the ability of the bitumen to withstand fatigue at average or nominal temperatures. The tests were conducted by reacting the bitumens in mass with the HL in closed containers in accordance with the previously enunciated testing protocols.

Evaluation of the Effects of HL on High Temperature Rheology

HL added directly to the bitumen binder in selected ranges from about 10% to about 20% by weight, based on the total weight of asphalt binder produces several high temperature rheology effects which can be summarized as follows:

HL added to binders has a very positive filler effect. This effect substantially improves high temperature rheological parameters which relate to resistance to permanent deformation.

Figure 1:
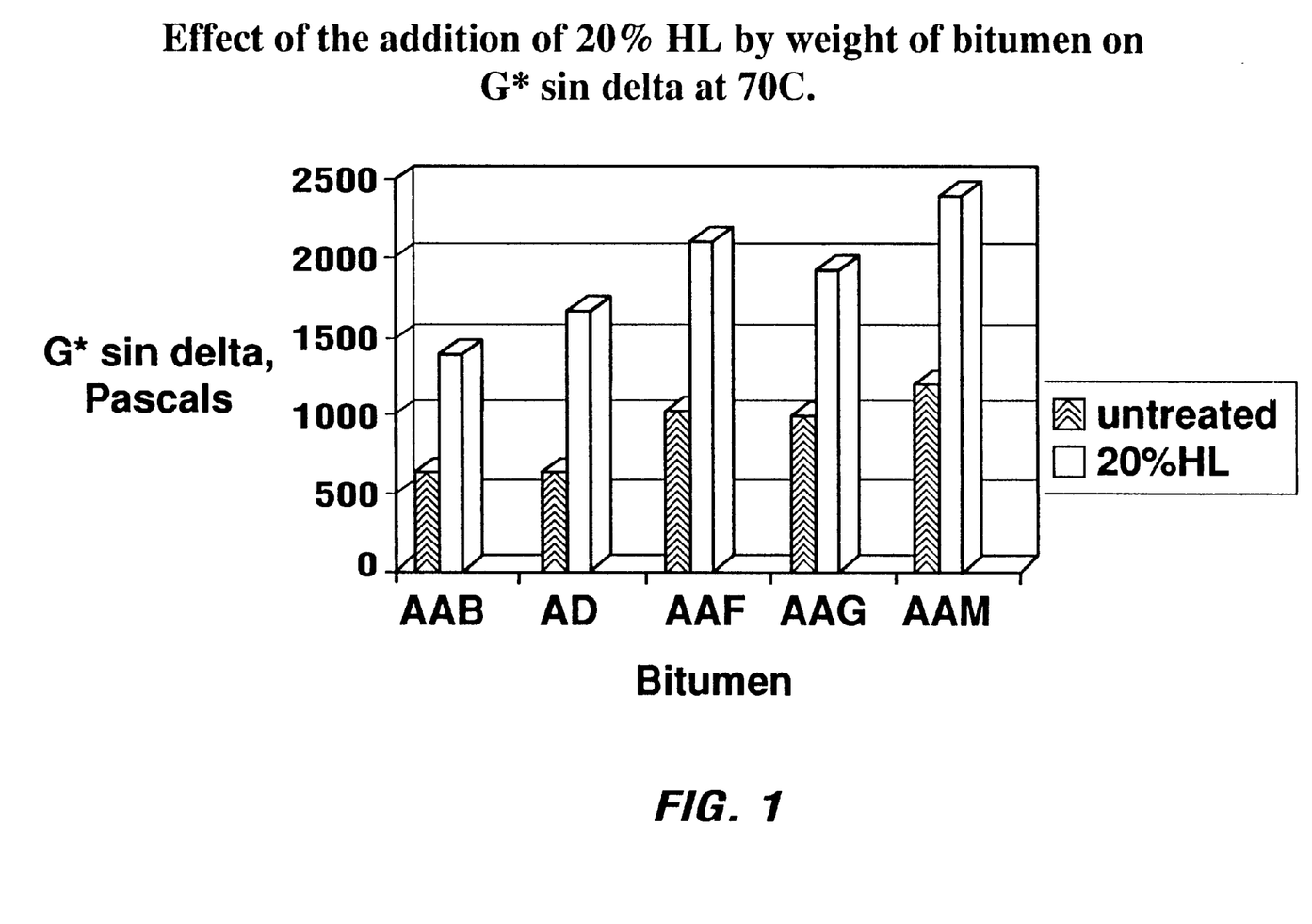
FIG. 1 is a graph of a SHRP parameter as a measure of permanent deformation potential for different bitumen binders with the addition of 20% HL by weight of asphalt binder.

FIG. 1 shows how 20% HL by weight asphalt binder dramatically changes the SHRP parameter $G^*/\sin \delta$ which is related to permanent deformation potential. A high G*/sin δ results in reduced permanent deformation potential.

Somewhere between 10% and 20% HL by weight asphalt binder is required to provide the desired high temperature rheological changes.

The high temperature rheology of HL-filled bitumens is dependent on the time and temperature of blending of HL with the bitumen. The process is bitumen specific. This finding demonstrates that the interaction between HL and bitumen is likely not simply physical but a chemical interaction may also exist.

Figure 2:
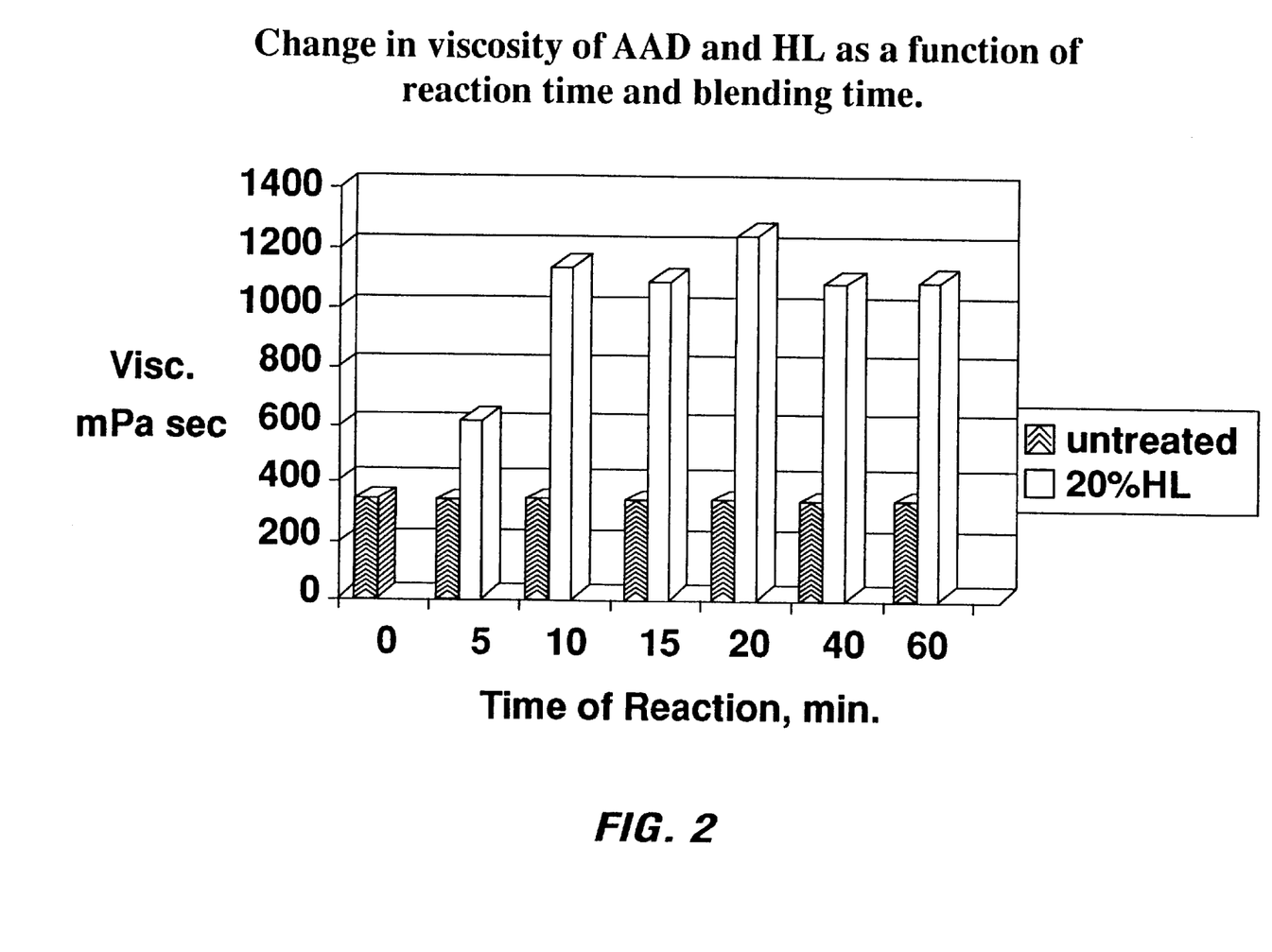
FIG. 2 is a graph of the change in viscosity of one HMA composition as a function of reaction time and blending time.
Figure 3:
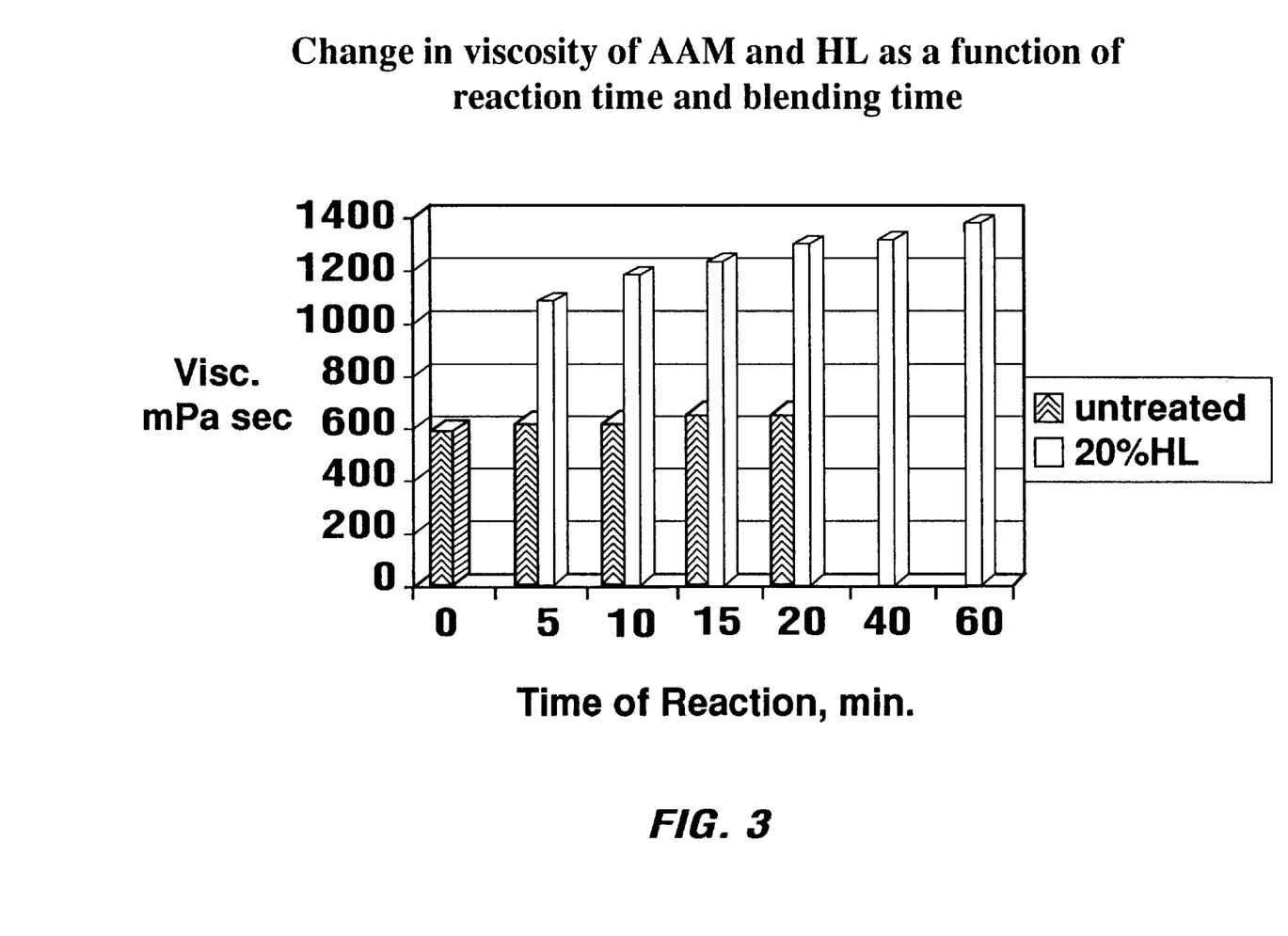
FIG. 3 is a graph similar to FIG. 2 but showing the results obtained with a second HMA composition.

FIGS. 2 and 3 illustrate the effect of reaction time at 149° C. on HL in bitumen AAD to reaction time of longer than five minutes. However, bitumen AAM requires a reaction time of about 40 minutes to achieve viscosity equilibrium. This indicates a physio-chemical interaction unique to specific binders. Note that the untreated bitumens are unaffected by reaction time. Since the bitumens were reacted in mass in closed containers, oxidative aging should not be a factor.

Evaluation of the Effects of HL on Low Temperature Rheology

The findings with regard to low temperature rheology are summarized as follows:

HL increases the low temperature stiffness of bitumens indicating that they are more susceptible to low temperature fracture. However, lime added at rates of 12.5% by weight of bitumen and below has a small effect on low temperature stiffness and does not significantly affect the slope of the stiffness versus time of loading curve determined using the low temperature Bending Beam Rheometer test. SHRP research indicates that the slope is more important.

To evaluate whether the stiffness increase at low temperature due to HL addition is important, low temperature fracture tests were performed. HL substantially improves low temperature fracture toughness. The improved fracture toughness and minimal effect on the slope of the stiffness versus time of loading curve indicates improved low temperature crack resistance despite the increased stiffness.

Figure 4:
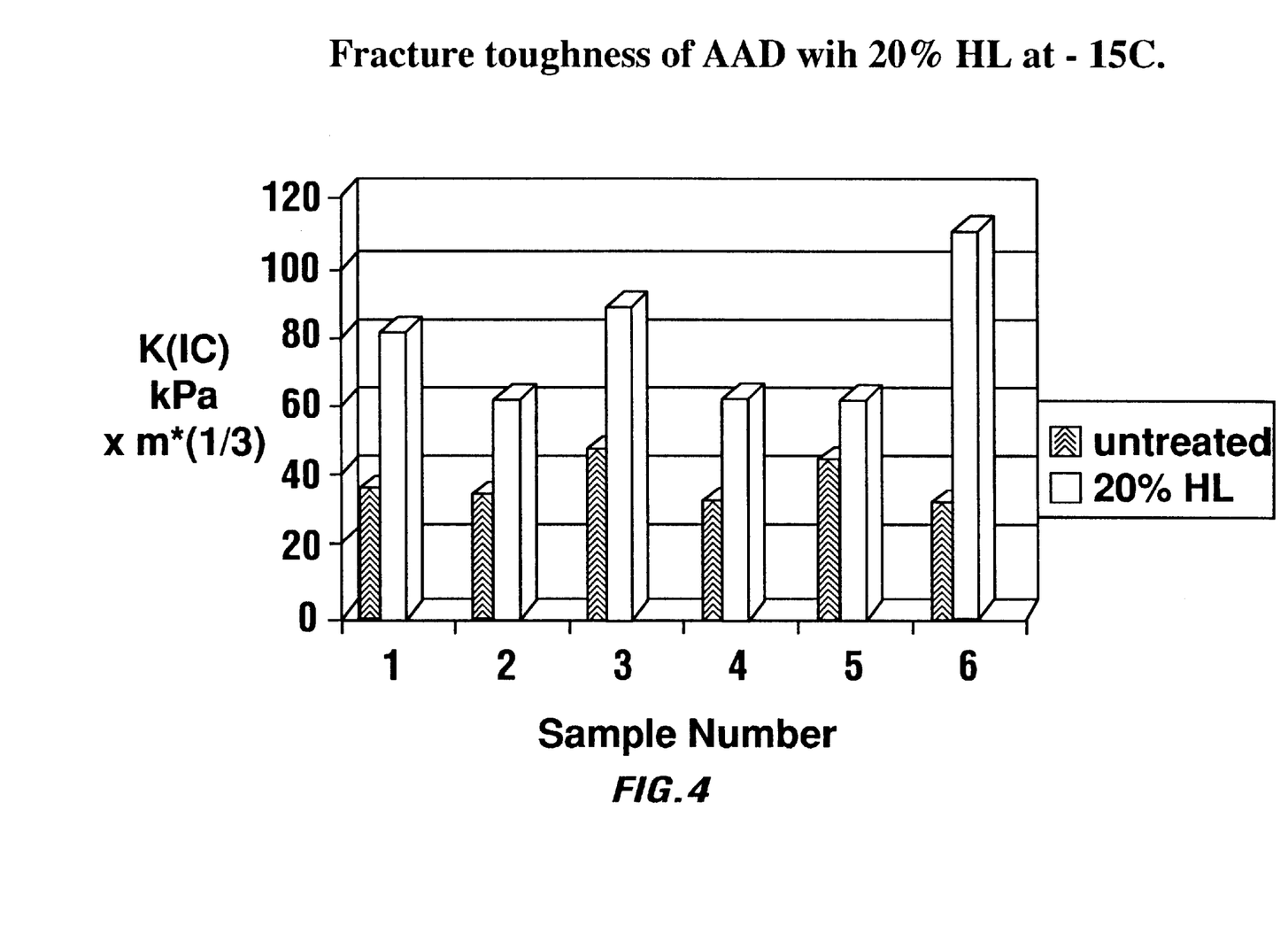
FIG. 4 is a graph of fracture toughness for one HMA composition with the addition of 20% by weight HL.
Figure 5:
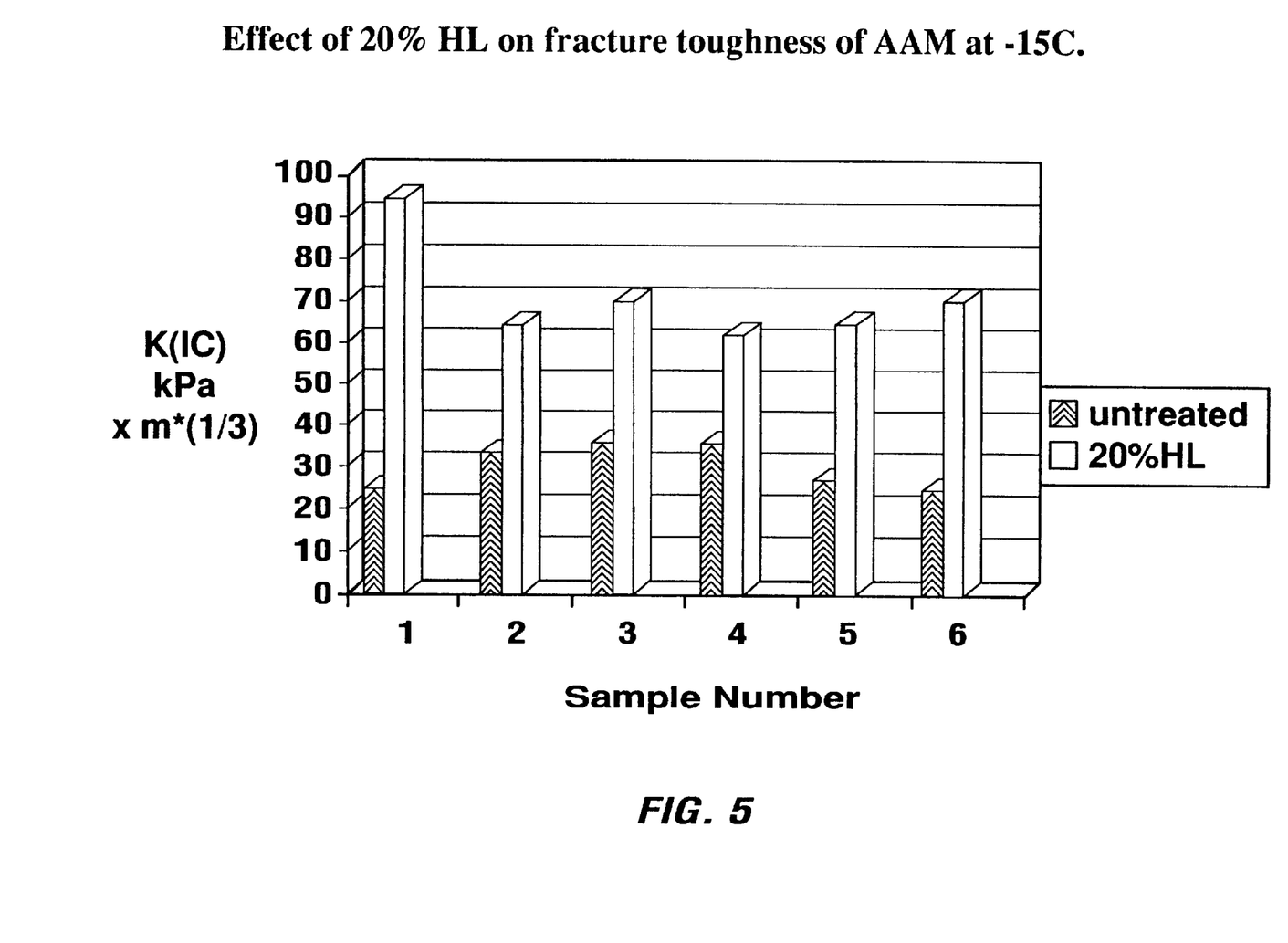
FIG. 5 is a graph similar to FIG. 4 but with a second HMA composition.

FIGS. 4 and 5 illustrate the effect of HL in improving fracture toughness.

The improved low temperature properties are due to a synergistic effect of reduction in the effect of oxidative aging (as all samples are aged to simulate pavement aging before testing) and crack pinning, a phenomenon of energy dissipation due to microcrack interception by the dispersion of HL particles in the bitumen.

Evaluation of Effects of HL on Intermediate Temperature Rheology

The filler effect of HL is obvious at all temperatures. However, at low temperatures the stiffening effect was proven to be more than compensated for by the improvement in fracture toughness. No generally recognized accepted binder tests are available by which to evaluate intermediate temperature fatigue susceptibility. Therefore, the following mixture tests used: direct tensile fatigue tests and microcrack healing tests. These tests provided favorable results which are discussed in the mixture section.

HL in Bitumen—Effects on Mixture Properties

Hydrated lime was added to two bitumens with very different chemical and physical properties. These bitumens are designated AAD and AAM. Mixtures with of Watsonville granite aggregate and 5.05% bitumen by total weight of the mixture were subject to two types of mixture tests: repeated shear permanent deformation testing and direct tensile fatigue testing. The repeated stress, permanent deformation testing was performed to assess rutting potential in the mixtures tested. The direct tensile fatigue testing was performed to assess the effect of lime on the potential of the mixture to develop fatigue cracking. These are two of the dominant distress mechanisms in hot mix asphalt pavements and are responsible for the vast majority of pavement damage and deterioration.

Results of Permanent Deformation Testing

The repeated shear permanent deformation testing was performed at 40° C. The testing was performed using a testing protocol developed in the SHRP research program to simulate the stress state that an asphalt mixture is subjected to under a moving wheel load. During the testing sequence the mixture is subjected to a constant ratio of axial stress and repeated shearing stresses.

Figure 6:
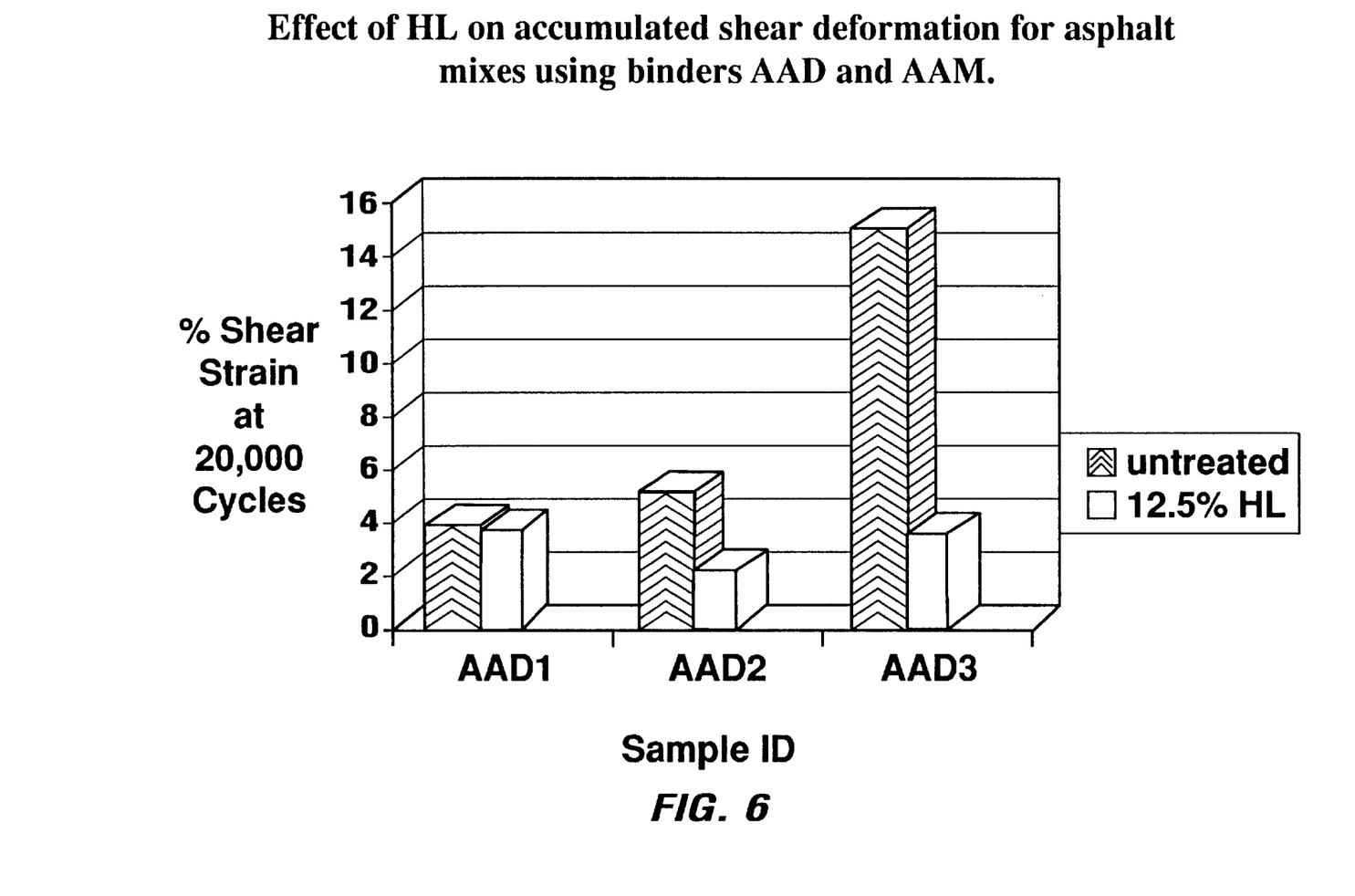
FIG. 6 is a graph of accumulated shear deformation for HMA mixes using two different bituminous binders.

Tests were performed on HMA mixtures prepared with four different bitumen binders with and without HL as follows: AAD, AAD 12.5% HL, AAM and AAM with 12.5% HL. Three identical samples were prepared for each mixture and the mixtures were subjected to a 20,000# load application. The tests revealed that the addition of HL reduced the level of permanent deformation on average about 300% ( FIG. 6), based on values of ultimate permanent strain after 20,000 cycles. The data were considerably variable, however.

Results of Direct Tensile Fatigue Testing

The purpose of direct tensile fatigue testing was to assess the resistance of asphalt mixtures to load-induced (controlled-strain) fatigue testing at intermediate (or average annual) pavement temperatures. Identical mixtures of Watsonville granite and 5.0% bitumen (by total weight of the mixture) were prepared with bitumen binders with and without HL as follows: AAD, AAD with 12.%% HL, AAM and AAM with 12.5% HL. Analysis of the results of controlled-strain fatigue testing demonstrated two findings. First, at a given level of stiffness, the addition of HL improved fatigue life. Second, the recovery of dissipated energy (responsible for crack healing) after rest periods is enhanced by the addition of HL for mixtures subject to age hardening. For a given design stiffness and for a mixtures subject to age hardening, the addition of HL appears to enhance the resistance to fatigue cracking.

Figure 7:
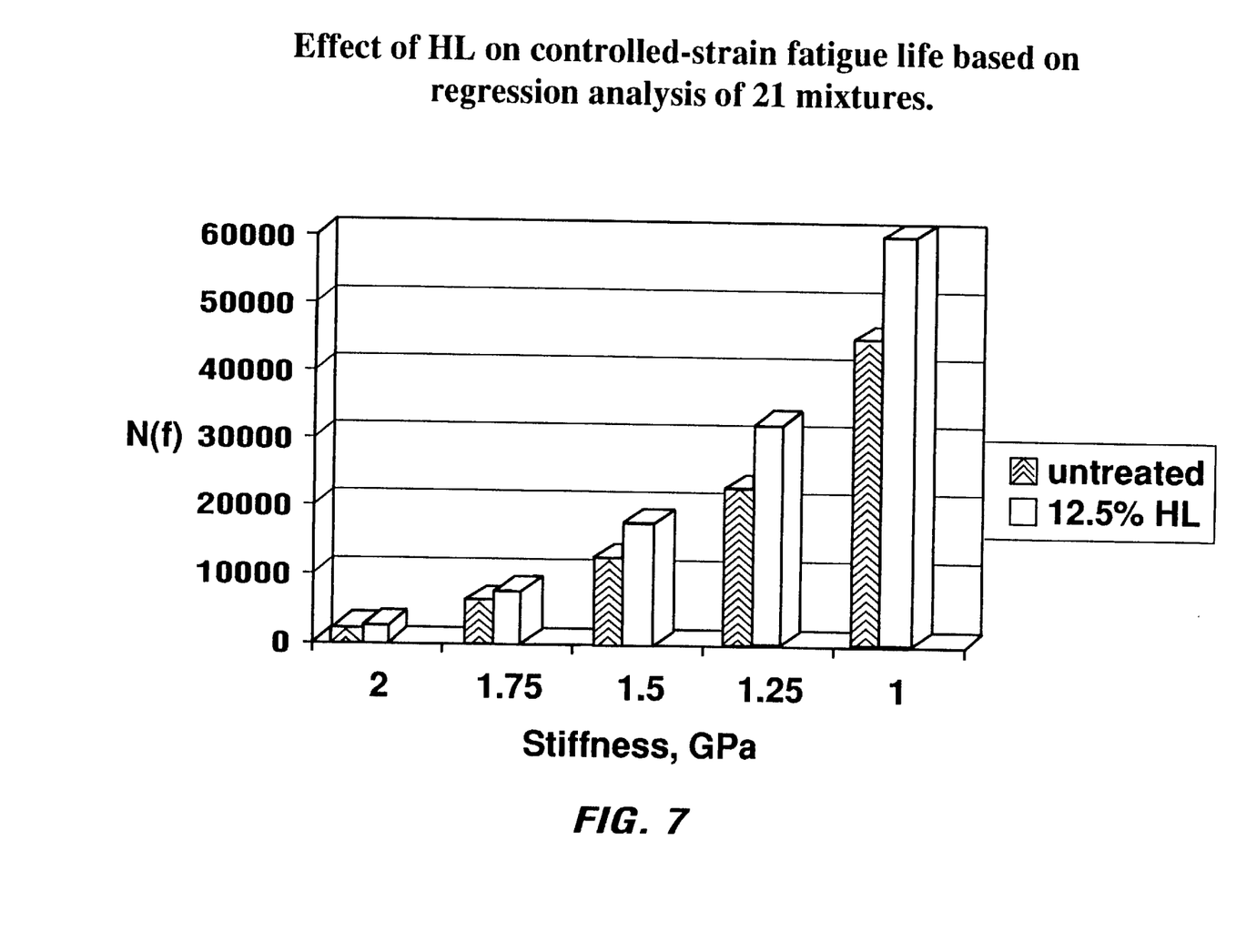
FIG. 7 is a graph of controlled-strain fatigue life comparing HMA's with and without the addition of HL.

FIG. 7 illustrates typical fatigue results where cycles to failure (Nf) are compared for untreated and HL treated mixtures at various mixture stiffness.

An invention has been shown with several advantages. HL is an effective multi-functional additive which is effective in improving the high temperature performance of hot mix asphalt.

Hydrated lime added directly to the asphalt binder improves Superpave binder Performance Grades (PG) by up to two grade levels. Furthermore, low temperature experiments demonstrate a toughening effect at low temperatures which improves the resistance of the modified binder to low temperature fracture.

Lime added directly to the asphalt binder shows the potential importance of this application in asphalt pavement recycling. The addition of lime reduces the hardening susceptibility and increases the activation energy of the binder systems subjected to accelerated aging.

The effects of adding increased weight percentages of hydrated lime directly to the asphalt binder are also evident in mixture tests. Lime added to the binder at rates of between about 10% and 20% by weight, based on the total weight of the composition, have proven to significantly reduce the resistance of mixtures to permanent deformation (rutting) when the mixture is subjected to a constant stress ratio repeated shear deformation test. These results have been demonstrated using the Superpave protocol to assess permanent deformation potential.

Uniaxial tensile controlled strain fatigue tests, performed on mixtures with and without the addition of hydrated lime added directly to the binder, demonstrate that the lime addition improves the fatigue life of the mixture (resistance to cracking) when mixtures are compared at a common level of stiffness.

While the invention has been shown in only one of its forms, it is not thus limited but is susceptible to various changes and modifications without departing from the spirit thereof.

What is claimed is:

1. In a method of preparing a hot mix asphalt paving material containing mineral aggregate material and asphalt binder, the improvement comprising:

adding a lime component directly to the asphalt binder prior to addition of the asphalt binder to the mineral aggregate material to thereby form a lime-asphalt mixture;

combining the lime-asphalt mixture and the mineral aggregate material to form a hot mix asphalt; and wherein the lime component is added to the asphalt binder in an amount which exceeds about 10% by weight, based upon the total weight of asphalt binder.

2. The method of claim 1, wherein the lime component is hydrated lime.

3. The method of claim 2, wherein the hydrated lime is added to the asphalt binder in the range from about 10% to 20% by weight, based on the total weight of asphalt binder.

4. An improved hot mix asphalt paving composition, comprising:

a lime-asphalt mixture and mineral aggregate, the lime-asphalt mixture being first formed by adding a lime component directly to an asphalt binder prior to addition of the asphalt binder to the mineral aggregate material; and wherein the lime component is present in the lime-asphalt mixture in an amount which exceeds about 10% by weight, based upon the total weight of asphalt binder.

5. The composition of claim 4, wherein the lime component is hydrated lime.

6. The composition of claim 5, wherein the hydrated lime is present in the lime-asphalt mixture in the range from about 10% to 20% by weight, based on the total weight of asphalt binder.

7. A method of preparing a hot mix asphalt paving material containing mineral aggregate material and asphalt binder, the method comprising:

adding an effective amount of lime component directly to the asphalt binder prior to combining the asphalt binder and the mineral aggregate material to thereby form a lime-asphalt mixture; and combining the lime-asphalt mixture and the mineral aggregate material to form a hot mix asphalt.

8. The method of claim 7, wherein the lime component is hydrated lime or dolomitic lime.

* * * * *